US007189422B2

(12) United States Patent
Howie et al.

(10) Patent No.: US 7,189,422 B2
(45) Date of Patent: *Mar. 13, 2007

(54) METHOD FOR REDUCTION OF ACRYLAMIDE IN COCOA PRODUCTS, COCOA PRODUCTS HAVING REDUCED LEVELS OF ACRYLAMIDE, AND ARTICLE OF COMMERCE

(75) Inventors: John Keeney Howie, Oregonia, OH (US); Peter Yau Tak Lin, Liberty Township, OH (US); David Vincent Zyzak, Mason, OH (US)

(73) Assignee: The Procter and Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/603,278

(22) Filed: Jun. 25, 2003

(65) Prior Publication Data

US 2006/0210669 A1    Sep. 21, 2006

(51) Int. Cl.
*A23G 1/02* (2006.01)

(52) U.S. Cl. .................... 426/45; 426/631; 426/431

(58) Field of Classification Search .......... 426/45, 426/106, 593, 631, 656, 430, 431
See application file for complete search history.

(56) References Cited

U.S. PATENT DOCUMENTS

| | | | |
|---|---|---|---|
| 2,490,431 A | 12/1949 | Greene et al. | |
| 2,704,257 A | 3/1955 | De Sollano et al. | |
| 2,759,832 A | 8/1956 | Cording et al. | |
| 2,780,552 A | 2/1957 | Willard et al. | |
| 2,905,559 A | 9/1959 | Andersen et al. | |
| 3,085,020 A | 4/1963 | Backinger et al. | |
| 3,369,908 A | 2/1968 | Gonzales et al. | |
| 3,690,895 A | 9/1972 | Amadon et al. | |
| 3,917,866 A | 11/1975 | Purves et al. | |
| 3,987,210 A | 10/1976 | Cremer | |
| 3,998,975 A | 12/1976 | Liepa | |
| 4,210,594 A | 7/1980 | Logan et al. | |
| 4,985,269 A | 1/1991 | Irvin et al. | |
| 5,356,646 A | 10/1994 | Simic-Glavaski et al. | |
| 5,464,642 A | 11/1995 | Villagran et al. | |
| 5,464,643 A | 11/1995 | Lodge | |
| 5,558,886 A | 9/1996 | Martinez-Bustos et al. | |
| 6,066,353 A | 5/2000 | Villagran et al. | |
| 6,068,873 A | 5/2000 | Delrue et al. | |
| 6,287,622 B1 | 9/2001 | Villagran et al. | |
| 6,528,768 B1 | 3/2003 | Simic-Glavaski et al. | |
| 2004/0058054 A1* | 3/2004 | Elder et al. .................. | 426/658 |

FOREIGN PATENT DOCUMENTS

| | | |
|---|---|---|
| WO | WO 96/01572 | 1/1996 |
| WO | WO 01/91581 | 12/2001 |
| WO | WO 04/04484 | 1/2004 |

OTHER PUBLICATIONS

FAO/WHO Consultation on the Health Implications of Acrylamide in Food: Summary Report; Geneva Switzerland, Jun. 25-27, 2002.
Talburt & Smith; "Potato Processing"; 4th Edition, 1987, pp. 535-646.
Watson, S.A.; "Corn: Chemistry and Technology"; American Association of Cereal Chemists, 1987; pp. 410-420.
Zyzak, David A. et al.; "Acrylamide Formation Mechanism in Heated Foods"; Journal of Agricultural and Food Chemistry; vol. 51, No. 16, pp. 4782-4787, (Jul. 2003).
Biederman, Maurus, et al.; "Methods for Determining the Potential of Acrylamide Formation and Its Elimination in Raw Materials for Food Preparation, such as Potatoes"; Official Food Control Authority of the Canton of Zurich, (date N.A.).
Biederman, Maurus, et al.: "Experiments on Acrylamide Formation and Possibilities to Decrease the Potential of Acrylamide Formation in Potatoes"; Official Food Control Authority of the Canton of Zurich, (date N.A.).
Nielsen, Monk; "Enzyme Technology For Production of Protein Based Flavours"; Novo Nordisk; 1995.
WWW.Foodstandards.gov.uk; "Food Standards Agency Study of Acrylamide in Food Background Information and Research Findings"; Press Briefing May 17, 2002.
European Commission; Health & Consumer Protection Directorate—General; "Opinion of the Scientific Committee on Food on new findings regarding the presence of acrylamide in food"; Jul. 3, 2002.
Institute of Food Science & Technology (UK); "Additional Research on Acrylamide in Food Essential, Scientists Declare"; Joint Press Release FAO/WHO/51; Jun. 27, 2002.
www.cspinet.org; Center for Science in the Public Interest; "New Tests Confirm Acrylamide in American Foods"; Jun. 25, 2002.
Tareke, Eden, et al.; "Analysis of Acrylamide, a Carcinogen Formed in Heated Foodstuffs"; Journal of Agricultural and Food Chemistry, pp. A-I, (date N.A.).
Sanders, R.A., et al.; "An LC/MS Acrylamide Method and It's Use in Investigating the Role of Asparagine"; Presented at the Association of Analytical Communities ; Sep. 2002.
Zyzak, David; "Acrylamide: Mechanism of Formation in Heated Foods": Presented to the FDA Food Advisory Committee; Feb. 24, 2003.

* cited by examiner

*Primary Examiner*—Keith Hendricks
(74) *Attorney, Agent, or Firm*—Ingrid N. Hackett; Melody A. Jones; Kim W. Zerby

(57) ABSTRACT

Roasted cocoa beans having reduced levels of acrylamide, cocoa beans having reduced levels of asparagine, and an article of commerce. In one aspect, the invention provides a method for reducing the level of acrylamide in roasted cocoa beans comprising reducing the level of asparagine in cocoa beans. In another aspect, the invention provides a method for reducing the level of asparagine in cocoa beans comprising adding an asparagine-reducing enzyme to cocoa beans. In still another aspect, an article of commerce communicates to the consumer that the product comprising cocoa beans has reduced or low levels of asparagine and/or acrylamide.

4 Claims, 3 Drawing Sheets

Figure 2  Mode of action for asparaginase

METHOD FOR REDUCTION OF ACRYLAMIDE IN COCOA PRODUCTS, COCOA PRODUCTS HAVING REDUCED LEVELS OF ACRYLAMIDE, AND ARTICLE OF COMMERCE

FIELD OF INVENTION

The present invention relates to the reduction of acrylamide in cocoa products, especially the reduction of acrylamide in chocolate and chocolate products. The invention further relates to an article of commerce.

BACKGROUND OF THE INVENTION

Known as "the food of the Gods," chocolate is one of the world's most luxurious foods. Although chocolate has been enjoyed by mankind for over three-thousand years, researchers have only recently discovered that chocolate and other roasted cocoa bean products contain acrylamide.

In April 2002, the Swedish National Food Administration and researchers from Stockholm University announced their findings that acrylamide, a potentially cancer-causing chemical, is formed in many types of foods and beverages that undergo heat processing. Subsequently, it has been discovered that roasted cocoa bean products, such as chocolate, contain acrylamide. Acrylamide has a carcinogenic potency in rats that is similar to that of other carcinogens in food, but for humans, the relative potency in food and beverages is not known. Only limited human population data are available for acrylamide and these provide no evidence of cancer risk from occupational exposure. (*FAO/WHO Consultation on the Health Implications of Acrylamide in Food: Summary Report*; Geneva, Switzerland, 25–27 Jun. 2002.)

Although further research is needed to assess what health effects, if any, may result from human consumption of acrylamide at the levels commonly found in cocoa products, many consumers have voiced concern. Accordingly, it is an object of the present invention to provide a method for reducing the level of acrylamide in roasted cocoa beans. It is also an object of the present invention to provide roasted cocoa beans having reduced levels of acrylamide. Further, it is an object of the present invention to provide an article of commerce that communicates to the consumer that a roasted cocoa product has reduced or low levels of acrylamide.

SUMMARY OF THE INVENTION

In one aspect, the present invention provides a method for reducing the level of acrylamide in roasted cocoa beans. In one embodiment, the method comprises adding an asparagine-reducing enzyme to cocoa beans.

In another aspect, the present invention provides a method for reducing the level of asparagine in cocoa beans. In one embodiment, the method comprises adding an asparagine-reducing enzyme to cocoa beans.

In another aspect, the present invention provides roasted cocoa beans having reduced levels of acrylamide.

In another aspect, the present invention provides cocoa beans having reduced levels of asparagine.

In yet another aspect, the present invention provides an article of commerce that communicates to the consumer that a product comprising roasted cocoa beans has reduced or low levels of acrylamide.

In still another aspect, the present invention provides an article of commerce that communicates to the consumer that a product comprising cocoa beans has reduced or low levels of asparagine.

All documents cited herein are, in relevant part, incorporated herein by reference; the citation of any document is not to be construed as an admission that it is prior art with respect to the present invention.

As used herein, all percentages (%) are by weight unless otherwise indicated.

BRIEF DESCRIPTION OF THE DRAWINGS

FIG. 1 sets forth the proposed reaction mechanism by which acrylamide forms from asparagine and a carbonyl source (such as glucose). $R_1$ and $R_2$ can=H, $CH_3$, $CH_2OH$, $CH_2(CH_2)_nCH_3$, or any other component making up a reducing sugar; n can be any integer less than 10.

FIG. 2 sets forth the proposed reaction mechanism by which asparaginase reacts with asparagine to prevent the formation of acrylamide.

FIG. 3 sets forth a sample chromatogram for LC analysis of asparagine and aspartic acid. The x-axis represents retention time and the y-axis represents response.

DETAILED DESCRIPTION OF THE INVENTION

Applicants have discovered that asparagine, a naturally occurring amino acid found in virtually all living systems, can form acrylamide when heated. Thus, materials richer in asparagine, when heated, tend to contain higher levels of acrylamide; this is especially the case when asparagine-containing materials are heated in the presence of reducing sugars.

Figure 1:
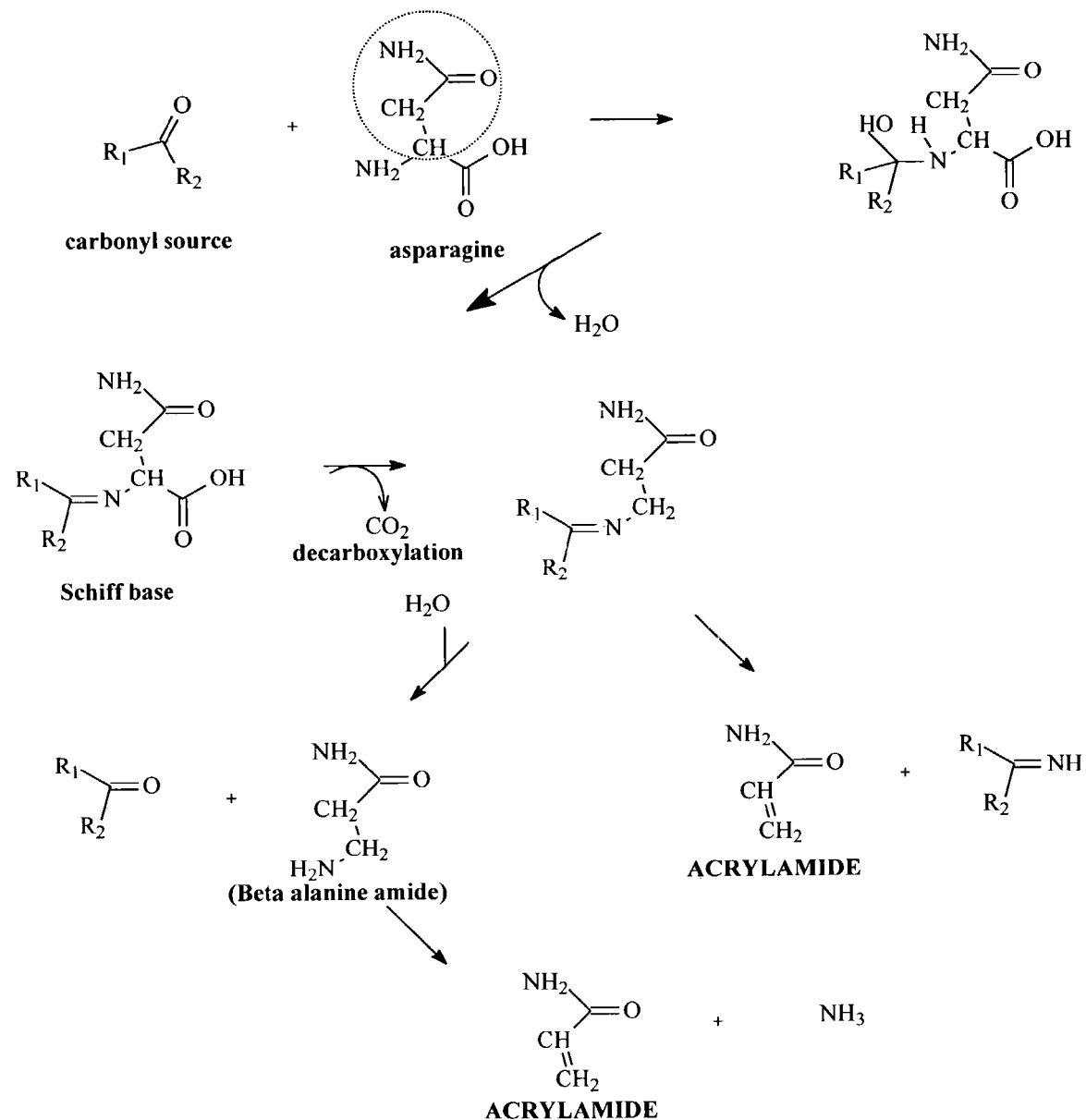
FIG. 1.

While not being limited by theory, it is believed that acrylamide forms via the reaction mechanism set forth in FIG. 1. It is believed that the alpha-amine group of free asparagine reacts with a carbonyl source, forming a Schiff base. Under heat, the Schiff base adduct decarboxylates, forming a product that can either: (1) hydrolyze to form beta-alanine amide (which can, under heat, further degrade to form acrylamide) or (2) decompose to form acrylamide and the corresponding imine. (Applicants have discovered that the circled precursor atoms comprise the carbons and nitrogens in acrylamide.)

Accordingly, acrylamide formation in roasted cocoa beans can be reduced by removing the asparagine or converting the asparagine in the cocoa beans to another substance before final roasting of the beans. When such beans containing reduced levels of asparagine undergo final roasting, the amount of acrylamide formed is reduced.

Figure 2:
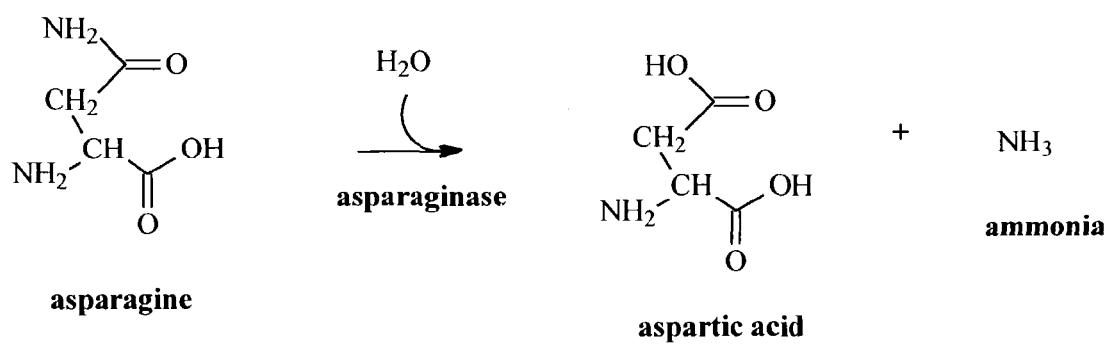
FIG. 2.

Adding an enzyme that hydrolyzes the amide group on the side chain of asparagine prior to final roasting of the cocoa beans reduces the level of acrylamide present in the roasted cocoa beans. While not being limited by theory, it is believed that the addition of such an enzyme degrades the side chain of asparagine, thus preventing the asparagine from forming acrylamide. In doing so, the amide bond is hydrolyzed and asparagine is converted to aspartic acid. This reaction mechanism is set forth in FIG. 2.

Preferred enzymes for use in the method herein include, but are not limited to, asparaginase. However, any enzyme capable of hydrolyzing the amide group of free asparagine to prevent the formation of acrylamide is within the scope of the present invention.

The advantages of using enzymes are numerous. These advantages include: (a) they are natural, nontoxic substances; (b) they generally catalyze a given reaction without causing unwanted side reactions; (c) they are active under very mild conditions of temperature and pH; (d) they are active at low concentrations; (e) the rate of reaction can be controlled by adjusting temperature, pH, and the amount of enzyme employed; and (f) they can be inactivated after the reaction has proceeded to the desired extent. (*Food Chemistry*, 4th Ed., Owen R. Fennema, Ed., Marcel Dekker, Inc., New York, 1985, pp. 427, 433.)

A. Method for Reduction of Acrylamide in Roasted Cocoa Beans

In one aspect, the present invention provides a method for the reduction of acrylamide in roasted cocoa beans. In one embodiment, the method comprises reducing the level of asparagine in cocoa beans. In another aspect, the method comprises adding an asparagine-reducing enzyme to cocoa beans. The preferred enzyme is asparaginase.

In a preferred embodiment, the present invention provides a method for reducing the level of acrylamide in roasted cocoa beans, comprising:

(1) providing cocoa beans containing asparagine;
(2) optionally drying the cocoa beans at low temperature;
(3) optionally roasting the cocoa beans;
(4) winnowing the cocoa beans to form nibs;
(5) optionally roasting the nibs;
(6) optionally grinding the nibs to form cocoa liquor;
(7) optionally roasting the cocoa liquor;
(8) optionally pressing the cocoa liquor to form cocoa cake and cocoa butter;
(9) optionally grinding the cocoa cake to make cocoa powder;
(10) optionally adding base before, during, or after any of the above steps 1–9; and
(11) adding enzyme before, during, or after any of steps 1–6 above.

1. Providing Cocoa Beans Containing Asparagine

The cacao tree, the source of the cocoa bean, grows in tropical and sub-tropical climates. Once picked, the mucilage covering the bean is removed. The beans are fermented for a number of days after harvesting, then dried. Any suitable dried cocoa beans, including mixtures of various types of beans, can be used in accordance with the present invention. As used herein, the term "cocoa beans" or "beans" includes cocoa beans in any suitable form as known in the art. Suitable cocoa beans include those described in Bernard W. Minifie, *Chocolate, Cocoa, and Confectionery*, AVI Publishing Co./Van Nostrand Reinhold, New York, N.Y., 1989 (hereinafter "*Chocolate, Cocoa, and Confectionery*").

2. Optionally Drying the Cocoa Beans at Low Temperature

The cocoa beans can optionally be dried by any suitable means at low temperature. Suitable drying methods include those known in the art, such as those disclosed in *Chocolate, Cocoa, and Confectionery*. As used herein, drying at low temperature means drying at a temperature low enough to dry the beans but not high enough to roast them.

3. Optionally Roasting the Cocoa Beans

The cocoa beans may optionally be roasted. Any suitable process comprising roasting can be used. As used herein, the term "roasting" includes any suitable thermal treatment of cocoa beans to create flavors that are indicative of cocoa. Suitable roasting techniques include those as known in the art, such as those described in *Chocolate, Cocoa, and Confectionery*. In another embodiment, the cocoa beans are roasted at a low temperature as known in the art.

4. Winnowing the Dried Cocoa Beans to Form Nibs

As known in the art, the dried cocoa beans are then winnowed to form nibs. The size of the nibs can be of any desired size. However, smaller sized nibs are preferred to facilitate enzyme migration throughout the nibs, due to the increased surface area and reduced distance of migration.

5. Optionally Roasting the Nibs

The nibs can then optionally be roasted by any suitable means. Suitable roasting techniques include those known in the art, such as those disclosed in *Chocolate, Cocoa, and Confectionery*.

6. Optionally Grinding the Nibs to Form Cocoa Liquor

The nibs can then be ground by any suitable means, such as those known in the art, to form cocoa liquor. Suitable grinding techniques include those disclosed in *Chocolate, Cocoa, and Confectionery*.

7. Optionally Roasting the Cocoa Liquor

The cocoa liquor can optionally be roased. In the case where the cocoa beans are only mildly roasted before forming the cocoa liquor and the moisture level is relatively high, enzyme can be added and allowed to react. The cocoa liquor is then further roasted to develop the flavors.

8. Optionally Pressing Cocoa Liquor into Cocoa Cake and Cocoa Butter

The cocoa liquor can optionally be pressed into cocoa cake and cocoa butter. Suitable pressing methods include those known in the art, such as those disclosed in *Chocolate, Cocoa, and Confectionery*.

9. Optionally Grinding the Cocoa Cake to Make Cocoa Powder

The cocoa cake can optionally be ground by any suitable means. Suitable grinding methods include those known in the art, such as those disclosed in *Chocolate, Cocoa, and Confectionery*.

10. Optionally Adding Base Before, During, or After Any of the Above Steps 1–9 Above Base can optionally be added during cocoa bean processing, as known in the art. See, e.g., *Chocolate, Cocoa, and Confectionery*.

11. Adding Asparagine-reducing Enzyme Before, During, or After Any of Steps 1–6 Above As used herein, "asparagine-reducing enzyme" includes any enzyme capable of reducing the level of asparagine in cocoa beans. In one embodiment, the asparagine-reducing enzyme is an enzyme capable of hydrolyzing the amide group of free asparagine. A preferred enzyme for use herein is asparaginase. A preferred source of asparaginase is Sigma-Aldrich, catalog #A2925.

As used herein, the terms "asparagine-reducing enzyme" and "enzyme" include one or more enzymes; for example, a mixture of two or more enzymes is encompassed by the terms. For example, deamidases that have asparagine-reducing functionality are included in the terms.

The enzyme may be added to the cocoa beans in any suitable form. For instance, the enzyme may be added as a powder or in the form of a solution. Furthermore, the enzyme may be added to the cocoa beans in any suitable manner, such as directly (for example, sprinkled, poured, or sprayed on the cocoa beans, or the cocoa beans can be soaked in an enzyme solution) or indirectly. As used herein, "adding" the enzyme to the cocoa beans includes, but is not limited to, any means of bringing the asparagine and the enzyme together.

In one embodiment, enzyme is added to the nibs. In this embodiment, the enzyme is preferably in the form of a solution and is applied via soaking or spraying the nibs, or combinations thereof.

The enzyme may be added at any suitable stage of the method before completion of final roasting to form the roasted cocoa beans. Furthermore, enzyme can be added during more than one stage of the method. In one embodiment, enzyme is added to the beans before or during fermentation. In another embodiment, an enzyme solution is soaked into the dry beans.

Enzymes are marketed by units of activity, rather than by weight or volume. Thus, the effective amount of enzyme required to achieve the desired level of acrylamide reduction will depend upon the activity of the particular enzyme product used.

The amount of enzyme to add can depend upon the level of asparagine reduction, and accordingly the level of acrylamide reduction, that is desired. The amount of enzyme to add can also depend upon the amount of asparagine present in the cocoa beans; cocoa beans higher in asparagine will generally require increased levels of enzyme or increased reaction time to achieve the same percentage of acrylamide reduction. The amount of enzyme to add can also depend upon the particular enzyme used (for example, the particular enzyme's enzymatic activity) and the particular type of cocoa beans treated. One skilled in the art will be able to determine the effective amount of enzyme based upon the specific type of cocoa, the specific enzyme, the enzyme's specific activity, and the desired result.

Preferred methods of adding the enzyme to the cocoa beans include spraying, soaking, sprinkling, and dominant bath. In one embodiment, enzyme solution is applied by spraying the solution onto the beans along with gentle agitation of the beans in order to create a uniform application to all the bean surfaces.

In another embodiment, cocoa beans are soaked in an enzyme solution to hydrate the beans. The amount of solution used depends upon the desired end moisture content of the beans. Enzyme solution can be used in such an amount that all the liquid is absorbed by the beans, or in such an amount that excess solution remains after solution absorption by the cocoa beans. In yet another embodiment, the cocoa beans are hydrated in a solution then an enzyme powder is sprinkled on the hydrated cocoa beans. The beans can be removed from solution by any suitable means of separating particulates from a solution, such as by screening.

In still another embodiment, enzyme is added to the beans by means of a dominant bath. In succession, several batches of beans are soaked in an enzyme containing solution until the soluble materials that extract from the beans are in or near equilibrium with the solution. In one embodiment, the enzyme in the dominant bath converts asparagine to aspartic acid, thus creating a driving force for additional asparagine extraction on subsequent additions of batches of beans. Extractable materials can equilibrate with the beans such that additional soluble cocoa components do not extract out, with the exception of asparagine, which continues to react and be converted by the enzyme. The aspartic acid that is formed from the asparagine soaks back into the beans and equilibrates. Additional water and/or enzyme-containing solution is added back after every batch of beans to make up for the solution going into the previous batch of beans; this maintains a constant volume of the dominant bath.

In one embodiment, at least a portion of the asparagine is extracted from the cocoa beans, the resulting extract is treated with the enzyme, then at least a portion of the extract is added back into at least a portion of the cocoa beans; for example, the enzyme may be added to the extract, or the extract may be pumped through a bed or column of immobilized enzyme (enzyme either adsorbed or chemically bonded to a substrate, preferably an inert substrate, e.g., pieces of plastic or beads in a column).

The amount of time needed for the enzyme to react with the asparagine will depend upon factors including, but not limited to, the desired level of asparagine (and thus acrylamide) reduction, the characteristics of the particular cocoa beans (e.g., chemical composition, amount of asparagine present, particle size), and the particular enzyme added. Preferably, the enzyme is allowed to react for a sufficient amount of time to result in cocoa beans wherein the level of asparagine is reduced by at least about 10%, preferably at least about 30%, more preferably at least about 50%, still more preferably at least about 70%, and even more preferably at least about 90%. In general, the longer the enzyme is allowed to react, the greater the level of asparagine reduction and thus the greater the level of acrylamide reduction in the roasted cocoa beans. The step of allowing a sufficient time for the enzyme to react can be carried out in any suitable manner; for example, it can be carried out simultaneously with adding the enzyme to the cocoa beans, mixing the enzyme with the cocoa beans, the absorption of the enzymatic solution by the cocoa beans, or combinations thereof.

As known in the art, pH and temperature are factors that affect enzymatic activity. One skilled in the art should readily be able to determine optimal conditions of these and other parameters (e.g., water content). In addition, optimal pH and temperature conditions for specific enzymes are typically available in the literature and/or from enzyme suppliers.

After the enzyme has reacted to the desired extent, it can optionally be inactivated or removed from the cocoa beans. When an enzyme that is safe for consumption (e.g., naturally occurring and found in common foods) is used, one may choose not to deactivate or remove the enzyme. Alternatively, the enzyme can be deactivated by any suitable means that inactivates the enzyme. For example, the enzyme can be deactivated through the use of heat, pH adjustment, treatment with a protease, or combinations thereof. Furthermore, the enzyme can be removed from the cocoa beans by any suitable means including, but not limited to, extraction. The enzyme can be deactivated, removed, or subjected to a combination of deactivation and removal.

Deactivating the enzyme may occur through heating, thus the optional deactivation step and roasting the cocoa beans may be carried out simultaneously. Heat processing can denature and inactivate the enzyme such that the roasted cocoa beans are not subjected to continuing enzymatic activity. Furthermore, at least a portion of the time allowed for enzymatic reaction may be carried out during the roasting step.

Deactivating the enzyme may occur through heating, thus the optional deactivation step and roasting the cocoa beans may be carried out simultaneously. Heat processing can denature and inactivate the enzyme such that the roasted cocoa beans are not subjected to continuing enzymatic activity. Furthermore, at least a portion of the time allowed for enzymatic reaction may be carried out during the roasting step.

12. Products Comprising Roasted Cocoa Beans

The roasted cocoa beans can be used as is or can be used to make a variety of roasted cocoa products, such as chocolate candies, candy bars, coatings, liquid concentrates, instant or powdered cocoas, cocoa beverages (e.g., hot and cold ready to serve cocoas, vended cocoas, commercial and at-home cocoas), mixes, confectionaries (e.g., candy), desserts (e.g., cakes, ice creams, mousses, custards), pastries (e.g., danish, donuts), sauces, and soups (e.g., chili).

Roasted cocoa bean products comprising the roasted cocoa beans of the present invention can have a reduction in the acrylamide level of at least about 10%, preferably at least about 30%, more preferably at least about 50%, still more preferably at least about 70%, and even more preferably at least about 90%.

In one embodiment, dark cocoa powder comprises less than about 350 ppb acrylamide, preferably less than about 250 ppb, more preferably less than about 100 ppb.

B. Means of Practicing the Method

The present invention can be practiced by any suitable means. For example, the method herein can be practiced in batch, semi-batch, or continuous mode.

C. Article of Commerce

In another aspect, the present invention provides an article of commerce. In one embodiment, the article of commerce comprises:

(a) a product comprising roasted cocoa beans, wherein said roasted cocoa beans have a reduced level of acrylamide;
(b) a container for containing the product; and
(c) a message associated with the container.

The message associated with the container informs the consumer that the product has a reduced level of acrylamide. In one embodiment, the message informs the consumer that the product is made with cocoa beans having reduced or low levels of asparagine. The message can be printed material attached directly or indirectly to the container, attached directly or indirectly near the container, or alternatively can be a printed, electronic, or broadcast message associated with the container. Suitable messages include, but are not limited to, messages that communicate "reduced" or "low" levels of acrylamide, messages that communicate that less than a specified amount of acrylamide is present, and messages that communicate that the roasted cocoa beans, product comprising roasted cocoa beans, and/or article of commerce meet or exceed a suggested or mandatory level (e.g., regulatory threshold or signal level).

Any container from which the product comprising the roasted cocoa beans can be dispensed, presented, displayed, or stored is suitable. Suitable containers include, but are not limited to, bags, canisters, boxes, bowls, plates, tubs, and cans.

Analytical Methods

Parameters used to characterize elements of the present invention are quantified by particular analytical methods. These methods are described in detail as follows.

1. Acrylamide

Method for Measuring Acrylamide (AA) in Food Products

Summary

Food products are spiked with 1-$^{13}$C-acrylamide ($^{13}$C-AA) and extracted with hot water. The aqueous supernatant is extracted three times with ethyl acetate, and the ethyl acetate extracts are combined and concentrated and analyzed by LC/MS with selected ion monitoring for specific detection of AA and $^{13}$C-AA.

Extraction of Sample

1. Weigh 6.00±0.01 g of sample into a 125-mL Erlenmeyer flask. Note: Place the sample into a food processor and pulse for 30 seconds so that the particle size is about ⅛ inch or less. If the sample is too small to be effectively ground in a food processor, place the sample in a new plastic bag (e.g., Whirl-Pak™ or equivalent) and pulverize with a rubber mallet until the particle size is ⅛ inch or less.
2. Add 120 μL of 100 ng/μL $^{13}$C-AA in de-ionized distilled water (ISTD 2), with an adjustable 1000-μL pipette (calibrated), directly onto the sample.
3. Using a dispenser, add 40 mL of de-ionized distilled water to the flask and cover with foil.
4. Place into a 65° C. water bath for 30 min.
5. With a dispenser, add 10 mL of ethylene dichloride to the flask, and homogenize with a Tekmar Tissumizer™ (SDT-1810) or Ultra-Turrax® (T18 Basic) for 30 seconds, or until uniform. Rinse the probe into the flask with deionized distilled water.
6. Place 25 g of the homogenate into an 8-dram vial
7. Tightly cap the tube and centrifuge for 30 minutes at 2500–5200 RPM.
8. Transfer 8 g of supernatant to another 8-dram vial being careful to avoid solid particles.
9. Add 10 mL of ethyl acetate with a dispenser, cap, and vortex for 10 seconds.
10. Allow any emulsion to break up; help by swirling or shaking once or twice and then allowing layers to split.
11. Transfer as much of the top layer (ethyl acetate) as possible to a scintillation vial, without transferring any liquid (water) from the interface. Extract twice more with 5-mL portions of ethyl acetate and add to the same scintillation vial. Then, add approximately 2 g of anhydrous sodium sulfate.
12. Concentrate the extract with a gentle stream of nitrogen in a 60–65° C. water bath to about 1 mL. Transfer the extract to a Pierce REACTI-VIAL™ or equivalent conical-shaped glass vial and further concentrate the extract to a final volume of approximately 100–200 μL. Place this extract into an autosampler vial with a conical sleeve.

Preparation of Standards

| | Stock Solutions and Internal Standards | | | |
|---|---|---|---|---|
| Solution | Weight | Volumetric Flask | Solvent | Concentration (ppm) |
| Stock 1 | 0.1000 g Acrylamide (AA) | 100-mL | Ethyl Acetate | 1000 |
| ISTD 1 | 0.0100 g $^{13}$C-Acrylamide | 100-mL | Ethyl Acetate | 100 |
| Stock 2 | 0.1000 g Acrylamide (AA) | 100-mL | Deionized Distilled Water | 1000 |
| ISTD 2 | 0.0100 g $^{13}$C-Acrylamide | 100-mL | Deionized Distilled Water | 100 |

Intermediate Standards

| Solution | Volume Stock 1 AA (µL) | Volumetric Flask (mL) | Solvent | Concentration (ppm) |
|---|---|---|---|---|
| INT 1 | 100 | 10 | Ethyl Acetate | 10 |
| INT 2 | 1000 | 10 | Ethyl Acetate | 100 |

Calibration Standards

| Standard | Volume INT 1 (µL) | Volume INT 2 (µL) | Volume ISTD 1 (µL) | Volumetric Flask (mL) | Solvent | Conc. AA (ppm) | Conc. ISTD 1 (ppm) |
|---|---|---|---|---|---|---|---|
| 0 | 0 | 0 | 450 | 10 | Ethyl Acetate | 0 | 4.50 |
| 0.25 | 250 | 0 | 450 | 10 | Ethyl Acetate | 0.250 | 4.50 |
| 0.75 | 750 | 0 | 450 | 10 | Ethyl Acetate | 0.750 | 4.50 |
| 1.5 | 0 | 150 | 450 | 10 | Ethyl Acetate | 1.50 | 4.50 |
| 3.0 | 0 | 300 | 450 | 10 | Ethyl Acetate | 3.00 | 4.50 |
| 5.0 | 0 | 500 | 450 | 10 | Ethyl Acetate | 5.00 | 4.50 |

Homogenizer Cleaning Procedure

Use this cleaning procedure between every sample.
1. Fill a 1-L Erlenmeyer flask with hot tap water (≈80% full) and add a drop of Dawn™ dishwashing liquid (available from the Procter & Gamble Co.) or equivalent.
2. Insert the dispersing element probe into the water as far as possible.
3. Homogenize the solution for about 10–15 seconds.
4. Empty the cleaning solution from the Erlenmeyer; rinse and refill the flask with hot tap water.
5. Homogenize again for about 10–15 seconds.
6. Empty the flask and refill with hot tap water; homogenize again for about 10–15 seconds.
7. If the water is not clear and free of particulates, continue homogenizing clean hot tap water as many times as necessary to achieve this condition.
8. When the hot tap water is clear and free of particulates, rinse the probe with deionized distilled water.

Analysis by LC/MS

Samples are analyzed using a Waters 2690 LC interfaced to a Micromass LCZ mass spectrometer.

Data Analysis

| | |
|---|---|
| Mobile Phase | 100% $H_2O$, 10 mM $NH_4Ac$, adjusted to pH 4.6 w/formic acid |
| Column | 2.0 mm × 150 mm, YMC C18 AQ (available from Waters Corp.) |
| Flow rate | 0.2 mL/min |
| Interface | Direct (no split) |
| Injection volume | 5 µL |

-continued

Data Analysis

| | |
|---|---|
| MS ionization mode | Electrospray, positive ion mode |
| MS detection mode | Selected ion monitoring: m/z 72 (AA), m/z 73 ($^{13}$C-AA); dwell times: 0.5 s |

Response ratios (area of AA peak/area of $^{13}$C-AA peak) are plotted against the corresponding concentration ratios for a series of five standards in ethyl acetate. All standards contain 4.5 µg/mL $^{13}$C-AA, and AA concentrations ranging from 0 to 5 µg/mL. Linear regression results in a calibration curve from which concentration ratios in extracts are determined from measured response ratios. When this concentration ratio is multiplied by the accurately known $^{13}$C-AA level (nominally 2 ppm) added to sample in step two of the extraction procedure, the level of AA in ppm results.

Sample Calculation for LC/MS:

The calibration curve is generated by plotting the response ratio (area m/z 72/area m/z 73) on the y axis vs. the concentration ratio ([AA]/[13C-AA]) on the x-axis. For this example, the equation of that line is y=0.899x+0.0123.

Measured area of AA peak (m/z 72) at 4.0 min: 100,000

Measured area of 13C-AA peak (m/z 73) at 4.0 min: 500,000

Response ratio $R_r$=0.200. From the slope and intercept of the calibration curve, the concentration ratio $R_c$ is calculated: $R_c$=(0.200−0.0123)/0.899=0.209

Given the spike level of 13C-AA in the sample (2 ppm), the measured level of AA is 0.209×2 ppm=0.418 ppm Quality Assurance/Quality Control (QA/QC)
1. All balances used in the preparation of standards and/or samples, must have their calibrations checked weekly with a set of qualified weights. The balances should be checked with at least three weights covering the range of sample/standard weights to be measured.
2. A six-point calibration curve should be performed daily.
3. A working reference material (WRM) should be analyzed with each set of samples. The concentration of this material should be within 2σ of the running mean. If it is not, the instrument should be recalibrated and the WRM recalculated.

2. Asparagine

Determination of Asparagine and Aspartic Acid in Food and Beverage Products

Principle

A weighed amount of sample is mixed with 5% HCl and heated for 30 minutes, then homogenized. A portion of the homogenate is centrifuged and then a portion of the supernatant is diluted and treated with FMOC reagent (9-fluorenylmethyl chloroformate), which reacts with asparagine and aspartic acid to form a highly fluorescent derivative. Reverse-phase HPLC is then used to resolve FMOC-asparagine from other sample matrix components. Detection is by fluorescence emission at 313 nanometers (nm) upon excitation at 260 nm. Analysis of standards of known concentration permits quantification.

Linearity

Working calibration curve of four standards (50–600 ppm) give a correlation of 0.998 or better. A curve taken out to 2000 ppm also gives a correlation of 0.998.

Accuracy

Potato Products:

Potato starch is spiked with four levels of both asparagine and aspartic acid (40, 200, 400, and 600 ppm). Recovery of asparagine is 100% (Relative standard deviation of less than 4%) and recovery of aspartic acid is 110% (Relative standard deviation of less than 4%).

REFERENCES

1. Herbert, P.; Santos, L; Alves, A. Journal of Food Science (2001), 66(9), 1319–1325.
2. Heems, Dany; Luck, Geneviewe; Fraudeau, Chrisophe; Verette, Eric. Journal of Chromatography, A (1998), 798 (1+2), 9–17.

System Repeatability

A working reference material of potato chip is run in duplicate over five days. Results are as follows:

|  | ug/g asparagine | ug/g aspartic acid |
|---|---|---|
| ave | 7832.07 | 1440.98 |
| STD | 625.59 | 195.80 |
| % RSTD | 7.99 | 13.59 |

Below are Suggested Chemicals and Equipment; However, Substitutions of Equivalent Materials are Acceptable.

| CHEMICALS | |
|---|---|
| Water, HPLC or Milli-Q ™ Grade (Millipore) | |
| Acetonitrile, HPLC Grade | Burdick & Jackson #AH015-4 |
| Methanol, HPLC Grade | Fisher #A452-4 |
| Ethyl Acetate | Baker #9280-3 |
| Pentane | Burdick & Jackson #GC312-4 |
| Asparagine monohydrate | EM Science |
| Aspartic acid | Sigma #A-8949 |
| aminoisobutyric acid | Sigma #A-8379 |
| 9-Fluorenyl Chloroformate (FMOC) | ICN #150200 |
| Sodium Borate | EM Science #SX 0355-1 |
| Boric Acid | Fisher #A-73 |
| Sodium Bicarbonate | ICN #194847 |
| Tetramethyl Ammonium Chloride | Fisher #04640-500 |
| Sodium Citrate | MCB #SX445 |
| Citric Acid anhydrous | Baker #0122-01 |
| Acetone | Burdick & Jackson #010-4 |
| Hydrochloric Acid, 0.1N | Fisher #SA48-500 |
| Calcium Chloride Dihydrate | Aldrich #22,350-6 |
| EQUIPMENT | |
| Transfer Pipettes, polyethylene (Samco #222) | |
| Volumetric Flasks (25, 100, 250, 1000 ml) | |
| Volumetric Pipet (10 ml) | |
| Graduated Cylinders (100–1000 ml) | |
| HPLC reservoirs (500 ml, 1 or 2 liter) | |
| Beakers | |
| Magnetic stirrers/stir bars | |
| Analytical (4-place) balance | |
| Scintillation Vials | |
| Centrifuge tubes, screw cap (100 × 16 mm) with caps | |
| Autosampler vials (8 × 30 mm, 1 ml), with crimp caps | |

Safety: This method requires the use of a fume hood, and involves exposure to chemicals. Please review Safe Practices for Fume Hood Use and Chemical Spills.

| INSTRUMENT | MODEL | MANUFACTURER |
|---|---|---|
| Robot | Microlab ® SPE | Hamilton |
| Pump/HPLC injector | HP 1100 | Agilent |
| Detector | RF10AXL | Shimadzu |
| Data System | Chemstation | Agilent |

Column

Phenomenex Luna 100×4.6 mm C-18(2) 3 micron # 00D-4251-EO

Preparation of Reagents

Diluent (pH 8.3–8.5; 1000 ml).
1. Weigh 3.0 grams of Sodium Borate, 3.0 grams of Boric Acid, and 8.0 grams of Sodium Bicarbonate into a dry tared beaker.
2. Place an empty 800 ml beaker on a magnetic stirrer. Add about 500 ml of Milli-Q™ water and a stir bar. Stir the water vigorously without splashing.
3. Quantitatively transfer the reagents from step 1 to the water; stir until they are completely dissolved.
4. Quantitatively transfer the solution from step 3 to a 1-liter volumetric flask and dilute to volume with Milli-Q™ water; mix well. Stable for up to six (6) months.

Calcium Chloride Solution (100 grams).
1. Weigh 40 grams of Calcium Chloride Dihydrate into a tared 250 ml beaker.
2. Add 60 grams of Milli-Q™ water. Mix well. Store at ambient conditions in a capped glass bottle. Stable for up to 1 year.

Extraction Solvent (Pentane: Ethyl Acetate 80:20; 500 ml)

Safety: pentane and ethyl acetate are volatile and flammable. Perform the following operations in a Fume Hood.
1. Transfer 400 ml of pentane to a 500 ml HPLC reservoir bottle.
2. Add 100 ml ethyl acetate. Mix well. Store capped in/under the Fume Hood.

Mobile Phase (Buffer:Methanol:Acetonitrile 60:5:35, pH 3.2, 2 L)
1. Weigh 1.35 grams of Tetramethyl Ammonium Chloride, 3.65 grams of Citric Acid, and 1.60 grams of Sodium Citrate into a dry tared beaker.
2. Place an empty 800 ml beaker on a magnetic stirrer. Add about 500 ml of Milli-Q™ water and a stir bar. Stir the water vigorously without splashing.
3. Quantitatively transfer the reagents from step 1 to the water; stir until they are completely dissolved.
4. Quantitatively transfer the solution from step 3 to a 1 liter graduated cylinder and dilute to 1000 ml with Milli-Q™ water; mix well.
5. Transfer to a 2-liter HPLC mobile phase reservoir.
6. Add 200 ml Milli-Q™ water, 100 ml methanol and 700 ml acetonitrile. Add the latter two solvents slowly with vigorous stirring. Perform this operation in a hood, and wear personal protective equipment. Refer to the relevant Material Safety Data Sheets (MSDS) for specific details.
7. Degas the mobile phase by vacuum aspiration while stirring.

FMOC Reagent Solution (in Acetone)
1. Weigh 0.10 grams of FMOC reagent into a tared 100 ml volumetric flask.

2. Add acetone to dissolve and dilute to volume with same. Mix well. Perform this operation in a hood. Wear PPE specified in the MSDS for the chemicals.
3. Store refrigerated for no more than six (6) months.

Acid Solution for Sample Extraction (5% HCl)
1. Add 100 ml of Milli-Q™ water into a 200 ml volumetric.
2. Add 4 ml of 1N HCl to volumetric.

Bring to volume with Milli-Q™ water.

Preparation of Internal Standard (Aminoisobutyric Acid)

ISTD A—Internal Standard Stock A
1. Weigh 0.5 grams of aminoisobutyric acid into a tared 250 ml volumetric
2. Add 25 ml of 1.0N HCl and about 100 ml Milli-Q™ water. Mix by swirling until dissolved. Dilute to volume with Milli-Q™ water and mix well. Store refrigerated for no more than six (6) months.

ISTD B—Working Internal Standard Solution B (This Solution is Added to Calibration Standards)
1. Pipet 1 ml of Internal Standard Stock A into a 100 ml volumetric flask.
2. Dilute to volume with Milli-Q™ water. Stable for one month.

Preparation of Calibration Standard(s)

Stock Calibration Solution.

Into a tared 50 ml volumetric, weigh 0.100 g (+/−0.001 g) asparagine and 0.100 g (+/−0.001 g) aspartic acid. Add 25 mL Milli-Q™ water and 1 mL 1 N HCl. Place in sonic bath until dissolved, then bring to volume with Milli-Q™ H2O. Solution is good for 6 months refrigerated.

Working Standards.

Prepare the following working calibration standards:

| Std # | mL stock | final volume (mL) | ppm |
|---|---|---|---|
| 1 | 5 | 200 | 50 |
| 2 | 5 | 100 | 100 |
| 3 | 1 | 10 | 200 |
| 4 | 3 | 10 | 600 |

Solutions are good for one month refrigerated.

Preparation of Samples
1. Weigh 1 g of sample into 125 ml Erlenmeyer flask.
2. Add 48.0 ml of 5% HCl solution to each sample.
3. Add 2 ml ISTD A to each sample.
4. Cover each flask with aluminum foil and place in 60 C water bath for 30 minutes.
5. Add 10 mL dicloroethane to each sample.
6. Homogenize sample for 60 seconds.
7. Pour portion of sample into 30 ml centrifuge tube.
8. Centrifuge at 10000 rpm for 32 minutes at 5° C. The supernatant is used in "Samples—Diluting" step 1.

Preparation of Standards and Samples

Three Microlab® methods are run in order to dilute the samples/standards, add the internal standard, and form the FMOC derivative. These are summarized below.

| Operation | Microlab method used |
|---|---|
| Dilution | TRANSDIL |
| Addition of Internal Standard | ADDISTD |
| Formation of FMOC derivative | ADDFMOC |

Preparation of Samples and Standards Using Microlab® Robot

Step 1: Standards—Adding ISTD and Dilution Step
1. Prepare two sets of tubes for each standard. Place approximately 2 mL of standard in one set of tubes, place these filled tubes on the left most position of the Microlab®.
2. Place the rack with empty tubes in the rightmost rack position of the Microlab®.
3. Fill a 20 ml glass (scintillation) vial with Working Internal Standard Solution B and place on the Microlab® workspace.
4. Select method ADDISTD. (Mixes 200 ul ISTD B, 50 ul standard solution, to 4000 ul total volume with Milli-Q™ water).
5. Execute the method.
6. Remove the tube set from the left position and set aside for discard.
7. Remove the Working Internal Standard Solution from the Microlab® work space and refrigerate.

Set aside right side tubes for step 3.

Step 2: Samples—Dilution Step (ISTD was Already Added During Sample Preparation)
1. Prepare two sets of tubes for each sample. Place approx. 2 mL of sample in one set of tubes, place these filled tubes on the left most position of the Microlab®.
2. Place the rack with the empty tubes in the rightmost rack position of the Microlab®.
3. Select method TRANSDIL. (Set # of samples, 50 ul for amount of sample, and 4000 ul for final dilution amount with Milli-Q™ water.)
4. Execute the method.
5. Remove the tube set from the left position and set aside for discard.

Set aside right side tubes for step 3.

Step 3: Addition of FMOC Reagent—Making Fluorescent Derivative
1. Prepare a rack of 100×16 mm screw-cap tubes.
2. Place the rack in the rightmost rack position of the Microlab®.
3. Place standard and sample tubes from above dilution steps in leftmost rack position of Microlab®.
4. Transfer an aliquot (22 mL) of FMOC reagent solution to a glass scintillation vial. Add approximately 100 μL of 40% Calcium Chloride solution; mix well. (Calcium chloride is added to make the FMOC reagent "charged"—necessary for detection by Microlab®).
5. Place the vial on the Microlab® workspace.
6. Select method ADDFMOC.
7. Switch syringes 1 & 2 from water to Diluent (pH 8.3–8.5).
8. Perform a wash of at least five (5) cycles for syringes 1 & 2 using Diluent (pH 8.3–8.5)
9. Execute method ADDFMOC. (Mixes 450 ul of FMOC solution, 250 ul sample from ADDISTD above to final volume of 1300 ul with diluent solution).
10. Remove the tube set from the SAMPLE rack position and set aside.

11. Remove the FMOC reagent solution from the Microlab® workspace and refrigerate.
13. Remove the tube set from the rightmost position and place in fume hood. Let stand for at least 10 minutes or until solution is clarified (but no longer than 20 minutes).
14. Add 2 ml of Extraction Solvent to each tube. Cap and vortex at high speed for two (2) minutes to extract unreacted FMOC reagent.
15. Prepare another tube set of 55×16 mm tubes. Add 1 ml of mobile phase solution to each tube.
16. Transfer the 1.0 mL of aqueous (lower) layer from the centrifuge tubes to the 55×16 mm tubes.
17. Discard the upper (organic) layer.
18. Transfer samples to autosampler vials and seal.

Chromatography

Operating Conditions

HP 1100 with Chem Station software
Detector: Waters 474 Scanning Fluorescence detector
  Mode: Norm
  Signal: 0.0000
  Wavelength: Ex 260
    Em 313
  Gain: 10
  Atten: 1
  Response: FST
Column: Phenomex Luna C18 (2) 100×4.6 mm 3 u LC Method Flow: 1.000 ml/min
Isocratic run (see preparation of reagents—Mobile Phase)
Injection volume: 10.0 ul
Temperature settings: not controlled Calculations Sample solutions are calculated against a standard curve of known amounts using area counts:

$y = mx + b$ $y$ (ratio asparagine/ISTD)=$m$ (slope)×(asparagine concentration)+$b$ ($y$-intercept)

$(y-b)/m = x$ ppm asparagine=(area asparagine/area ISTD−intercept)/slope

EXAMPLE ppm asparagine=(215.45436/551.828−−0.0165)/0.0023=176.93 ppm

[ppm=ug/mL]

Correction for Dilution/homogenization in Sample Preparation Step.

ug/g aspargine=ppm aspargine found ×mL sample dilution (50)/grams of sample

[ppm=ug/mL]

EXAMPLE ug/g aspargine=176.93 ppm×50 mls/1.0083 g=8773.65 ug/g

Run Acceptability Criteria:
  the Check Sample of Working Reference Material accuracy must be within 10% of known result for asparagine.
  the linearity of the calibration curve ($r^2$) must be 0.995 or greater.

Sample Chromatogram of LC Analysis

Figure 3:
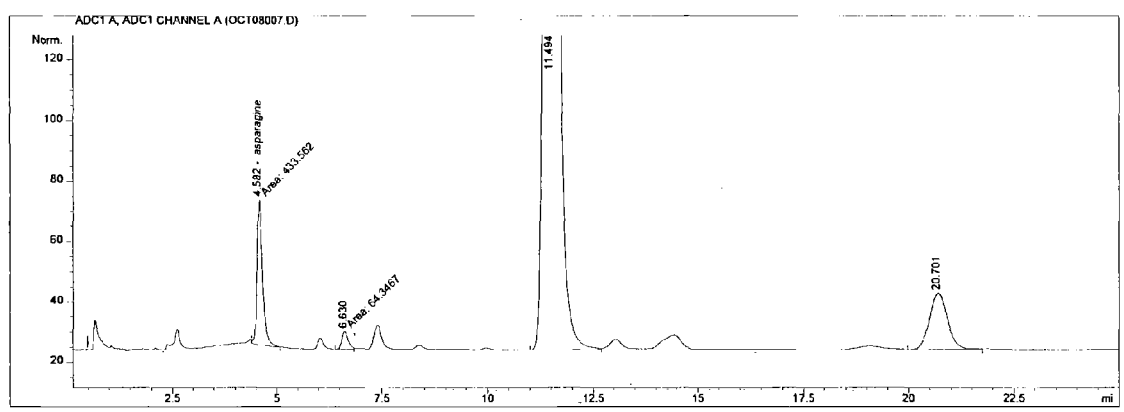
FIG. 3.

FIG. 3 sets forth a sample chromatogram of LC analysis.

| RT | Compound |
|---|---|
| 4.5 min | asparagine |
| 6.6 min | aspartic acid |
| 11.5 min | FMOC reagent |
| 20.7 min | ISTD |

3. % Reduction of Acrylamide

% Reduction Acrylamide=[(Acrylamide level in control sample−Acrylamide level in enzyme-treated sample)/Acrylamide level in control sample]×100.

The control sample is prepared in exactly the same manner as the enzyme-treated sample, with the exception that enzyme is not added.

4. % Reduction of Asparagine

% Reduction Asparagine=[(Asparagine level in control sample−Asparagine level in enzyme-treated sample)/Asparagine level in control sample]×100.

The control sample is prepared in exactly the same manner as the enzyme-treated sample, with the exception that enzyme is not added.

EXAMPLES

The following examples are illustrative of the present invention but are not meant to be limiting thereof.

Example 1

An effective amount of asparaginase is added to Ivory Coast cocoa beans in the form of a solution and allowed to react for a sufficient period of time such that the resulting roasted cocoa beans have greater than a 10% reduction in acrylamide. The enzyme-treated cocoa beans are then roasted, ground, and pressed as known in the art to form cocoa liquor. Two parts of 30% hydrogen peroxide solution is added to 100 parts of Ivory Coast cocoa liquor and heated to 100° C. for 1 hour with stirring. During this time, the water is evaporated and the resulting liquor has a desirable light color.

Example 2

A milk chocolate is prepared by a conventional method using the Ivory Coast cocoa liquor of Example 1. The milk chocolate has greater than a 10% reduction in acrylamide level.

Example 3

An effective amount of asparaginase is added to Ghana cocoa beans in the form of a solution and allowed to react for a sufficient period of time such that the resulting roasted cocoa beans have greater than a 10% reduction in acrylamide. The treated cocoa beans are then roasted and ground to form cocoa nibs, as known in the art. The Ghana cocoa nibs are soaked in 30% hydrogen peroxide for 30 minutes, rinsed several times with water, then dried at 65° C. in an oven. The nibs are ground to form cocoa liquor, as known in the art. A dark chocolate is then prepared by conventional methods using the Ghana cocoa liquor. This dark chocolate has greater than a 10% reduction in acrylamide level.

Example 4

The Ghana cocoa liquor of Example 3 is pressed using conventional methods into cocoa butter and cocoa cake. The cocoa cake is ground to form cocoa powder. The cocoa powder has greater than 10% reduction in acrylamide level.

Example 5

The milk chocolate of Example 2 is used to make chocolate candy bars as known in the art. The candy bars are packaged for retail sale to consumers. The labels on the candy bars read, "Acrylamide-free chocolate."

Example 6

The cocoa powder of Example 4 is packaged for commercial distribution. The sales brochure and the product specification sheet for the cocoa powder state that the cocoa powder has greater than 10% reduction in acrylamide.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for reducing the level of acrylamide formation in cocoa beans which comprise soluble materials and asparagine using an asparaginase-reducing enzyme, said method comprising the step of extracting at least a portion of asparagine from said cocoa beans to form an extract, contacting said extract with said enzyme for a sufficient amount of time to reduce the level of asparagine at least about 10%, and adding back at least a portion of said extract comprising said soluble materials to at least a portion of said cocoa beans, followed by roasting said beans.

2. A method according to claim 1 which employs a dominant bath comprising said enzyme, whereby soluble materials in said beans, with the exception of said asparagine, do not continue to extract out of said beans, once equilibrium has been reached.

3. A method according to claim 1, wherein said cocoa beans are winnowed to form nibs prior to extraction and contact with said enzyme.

4. A method according to claim 2, wherein said beans are winnowed to form nibs prior to contact with said enzyme-containing dominant bath.

\* \* \* \* \*